United States Patent [19]

Sasaki

[11] 4,203,135

[45] May 13, 1980

[54] EXTERNAL SYNCHRONIZING SIGNAL GENERATING CIRCUIT FOR A COLOR TELEVISION CAMERA

[75] Inventor: Takashi Sasaki, Higashiosaka, Japan

[73] Assignee: Sanyo Electric Co., Ltd., Moriguchi, Japan

[21] Appl. No.: 870,828

[22] Filed: Jan. 19, 1978

[30] Foreign Application Priority Data

Jan. 27, 1977 [JP] Japan ................................. 52-9496[U]
Jun. 30, 1977 [JP] Japan ............................... 52-88428[U]

[51] Int. Cl.² .......................... H04N 5/04; H04N 9/46
[52] U.S. Cl. ...................................... 358/149; 358/19
[58] Field of Search ............................ 358/17–19, 358/148, 149, 150, 152; 360/36; 331/18, 20, 25

[56] References Cited

U.S. PATENT DOCUMENTS

| 3,588,351 | 6/1971 | Baum | 358/150 X |
| 3,935,388 | 1/1976 | Brinkmann | 331/20 X |
| 4,038,683 | 7/1977 | Thorpe et al. | 358/19 |
| 4,059,842 | 11/1977 | Meacham | 358/150 |

FOREIGN PATENT DOCUMENTS 1239298  7/1971  United Kingdom ................... 358/149

OTHER PUBLICATIONS

*Synchronisation of Remote Sources;* ABU Technical Rev. No. 37, (Japan); Mar. 1975.

Primary Examiner—Robert L. Griffin
Assistant Examiner—Aristotelis M. Psitos
Attorney, Agent, or Firm—Armstrong, Nikaido, Marmelstein & Kubovcik

[57] ABSTRACT

A synchronizing signal generator wherein a frequency reference oscillator is phase controlled using an external subcarrier signal as a reference signal, and a frequency divider for frequency dividing the output of the reference oscillator is adapted to be reset responsive to an external synchronizing signal, whereby the said synchronizing signal generator is externally synchronized, characterized in that the said external synchronizing signal and an internal synchronizing signal generated in the said synchronizing signal generator are phase compared and resetting of the frequency divider by the said external synchronizing signal is disabled responsive to the coincidence of the phases of these external and internal synchronizing signals.

7 Claims, 7 Drawing Figures

EXTERNAL SYNCHRONIZING SIGNAL GENERATING CIRCUIT FOR A COLOR TELEVISION CAMERA

BACKGROUND OF THE INVENTION

1. Field of the Invention

The present invention relates to a synchronizing signal generator operable responsive to an external synchronizing signal. More specifically, the present invention relates to an improvement in a synchronizing signal generator suited for driving a television camera or cameras with an external synchronizing signal.

2. Description of the Prior Art

In superposing an output signal from a television camera in part in a television broadcast signal as received, combining the output signals from two or more television cameras, and the like to synthesize the television images on a television screen, it is necessary to synchronize a television camera with an external reference synchronizing signal. The present invention is directed to a synchronizing signal generator operable responsive to an external reference synchronizing signal and in particular is aimed to avoid phase disturbance of a horizontal synchronizing signal generated in such a synchronizing signal generator with respect to an external synchronizing signal.

FIG. 1 shows a block diagram of a conventional synchronizing signal generator operable responsive to an external synchronizing signal. Referring to FIG. 1, the synchronizing signal generator shown comprises a voltage controlled oscillator 1 adapted to make oscillation at the central frequency as high as four times the frequency of the subcarrier (14.31818 MHz). The output of the voltage controlled oscillator 1 is applied through an inverter 30 and further through an inverter 31 to a ¼ frequency divider 2 for frequency dividing the output of the voltage controlled oscillator 1 at the frequency division rate of ¼ for providing a subcarrier frequency signal and is also applied through the inverter 30 and further through the inverter 31 to a 1/7 frequency divider for frequency dividing the output of the voltage controlled oscillator 1 at the frequency division rate of 1/7. The frequency divided output Ci of the ¼ frequency divider 2 is applied to a phase comparator 3. The phase comparator 3 is also connected to receive an external subcarrier signal Ce of the frequency 3.579545 MHz. The phase comparator 3 serves to compare the phases of the subcarrier signal Ci from the ¼ frequency divider 2 and the external subcarrier signal Ce for providing a control voltage signal to the control input of the voltage controlled oscillator 1. Thus, the voltage controlled oscillator 1, the ¼ frequency divider 2 and the phase comparator 3 constitute a so called phase locked loop. The output of the 1/7 frequency divider 4 is applied to a 1/65 frequency divider 5 for frequency dividing the output of the 1/7 frequency divider 4 at the frequency division rate of 1/65 for providing the output of the frequency as high as two times the frequency of the horizontal synchronizing signal. The output of the 1/65 frequency divider 5 is applied to a first ½ frequency divider 7 for frequency dividing the output of the 1/65 frequency divider 5 at the frequency division rate of ½. The output of the 1/65 frequency divider 5 is also applied to a 1/525 frequency divider 6 for frequency dividing the output of the 1/65 frequency divider 5 at the frequency division rate of 1/525 for providing the output of the frequency as high as two times the field frequency. The output of the 1/525 frequency divider 6 is also applied to a second ½ frequency divider 8 for frequency dividing the output of the 1/525 frequency divider 6 at the frequency division rate of ½, thereby to provide the output signal of the same frequency as that of the vertical frame synchronizing signal.

The output of the 1/65 frequency divider 5 and the output of the first ½ frequency divider 7 are applied to a line decoder 9, where a horizontal synchronizing signal Hi of the phase which is different from field to field is generated responsive to the output of the first ½ frequency divider 7 and the output of the 1/65 frequency divider 5. The output of the 1/525 frequency divider 6 and the output of the second ½ frequency divider 8 are also applied to a frame decoder 10, wherein an odd number and even number field determining signals OF (odd field) and EF (even field) are generated. The output from the line decoder 9 and the output from the frame decoder 10 are applied to a composite decoder 11, wherein the output of the line decoder 9 and the output of the frame decoder 10 are synthesized to provide a composite synchronizing signal Cs, a color burst flag signal BF and a composite blanking signal CB. The above described blocks 2, 4, 5, 6, 7, 8, 9, 10 and 11 may be implemented in an integrated circuit L and such an integrated circuit for a synchronizing signal generator is commercially available from Fairchild Camera Instruments, Inc. as identified as MOS 3262 A.

An external vertical synchronizing signal Ve is applied through a delay circuit 12 for delaying the input signal by less than 1/60 second to the 1/525 frequency divider 6 by way of a reset signal. Similarly an external horizontal synchronizing signal He is applied through a delay circuit 13 for delaying the signal to the 1/7 frequency divider 4, the 1/65 frequency divider 5 and the first ½ frequency divider 7 as a reset signal. Since the integrated circuit L is structured such that the internal horizontal synchronizing signal Hi is obtained from the line decoder 9 with a given delay time from the reset timing responsive to the external horizontal synchronizing signal He and the internal vertical synchronizing signal Vi is obtained from the frame decoder 10 with another delay time from the reset timing responsive to the external vertical synchronizing signal Ve, respectively, the delay circuits 13 and 12 are provided to delay the above described external horizontal and vertical synchronizing signals He and Ve, respectively, by given time periods so that the phases of the internal horizontal and vertical synchronizing signals Hi and Vi come to coincide with each other. The delay circuits 13 and 12 are also aimed to set the pulse width of the horizontal and vertical reset signals.

In such a conventional synchronizing signal generator, however, it has been noted that a problem is encountered. More specifically, in such a synchronizing signal generator, the external subcarrier signal Ce to be applied to the phase comparator 3 is not always in the same predetermined phase relation with the external horizontal synchronizing signal He. The reason is that even if these external subcarrier signal Ce and external horizontal synchronizing signal He are generated by the use of a common external synchronizing signal source, the amounts of the phase delay which the external subcarrier signal Ce and the external horizontal synchronizing signal He undergo are different depending on the lenghts of the cable connecting the synchronizing signal generator to such external synchronizing signal source.

Thus, even when the oscillation output of the voltage controlled oscillator 1 to be phase locked to the external subcarrier signal Ce is in a given phase relation with the external horizontal synchronizing signal He, the phase relation of the internal horizontal synchronizing signal Hi is not properly determined.

FIG. 2 shows wave forms of various signals in the FIG. 1 diagram for explaining the operation of the FIG. 1 diagram. Referring to FIG. 2, assuming that a phase relation is established such that the fall of the output (a) from the voltage controlled oscillator 1 and the rise of the output (b) from the delay circuit 13 for determining the reset timing coincide with each other, then even a slight shift leftward or rightward of the timing of the rise of the above described wave form (b) by virtue of a temperature drift or the like at the respective reset timing for each one horizontal line makes a difference in start of a counting operation in the frequency divider 4 depending on the situation, such as from the pulse n, the next pulse n+1 or the like. As a result, an internal horizontal synchronizing pulse (c) or (d) as different of the phase by one cycle of the reference oscillation pulse (a), i.e. 0.07 microsecond is obtained from the synchronizing signal generator and in addition which internal horizontal synchronizing pulse (c) or (d) should appear at every reset timing for each horizontal line is not inherently determined. As a matter of practice, however, the internal horizontal synchronizing signal of the wave form (c) or (d) appears at random or possibly appears alternately for each horizontal line, as comfirmed through experimentation and if television cameras are driven with such a horizontal synchronizing signal, an image on the television screen is distorted in the vertical direction. Referring to FIG. 2, it is pointed out that the leading edge of the internal horizontal synchronizing pulse (c) has been shown as delayed with respect to the trailing edge of the delay circuit output (b), because of an inherent delay in the integrated circuit L.

SUMMARY OF THE INVENTION

Briefly described, the present invention comprises a synchronizing signal generator wherein a frequency reference oscillator is phase controlled using an external subcarrier signal as a reference signal, and a frequency divider for frequency dividing the output of the reference oscillator is adapted to be reset responsive to an external synchronizing signal, whereby the said synchronizing signal generator is externally synchronized, characterized in that the said external synchronizing signal and an internal synchronizing signal generated in the said synchronizing signal generator are phase compared and resetting of the frequency divider by the said external synchronizing signal is disabled responsive to the coincidence of the phases of these external and internal synchronizing signals.

According to another aspects of the present invention, there is provided a synchronizing signal generator comprising an oscillator for oscillating in synchronism with an external subcarrier signal, a synchronizing signal generating circuit for frequency dividing the oscillation output for providing an internal horizontal synchronizing signal and an internal vertical synchronizing signal, a horizontal synchronizing signal delay circuit for delaying an external horizontal synchronizing signal by a delay amount inherent to the said synchronizing signal generating circuit, a gate circuit for detecting the phase difference exceeding a predetermined value between the said internal horizontal synchronizing signal and the said external horizontal synchronizing signal for conditionally providing the said horizontal synchronizing delay circuit output to the horizontal reset terminal of the synchronizing signal generating circuit, and a vertical synchronizing signal delay circuit for delaying an external vertical synchronizing signal by the delay amount inherent to the said synchronizing signal generating circuit for providing the output to the vertical reset terminal, said horizontal synchronizing signal delay circuit being structured in a variable delay circuit periodically variable of the delay amount.

Accordingly, a principal object of the present invention is to provide a synchronizing signal generator operable responsive to an external synchronizing signal, wherein synchronization is achieved with an external synchronizing signal assuredly without phase disturbance in the horizontal synchronizing signal output from the synchronizing signal generator, with simple modification to a conventional synchronizing signal generator.

Another object of the present invention is to provide an improved synchronizing signal generator operable responsive to an external synchronizing signal, wherein a stabilized synchronizing signal is obtained without an error at any temperature.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a block diagram of one embodiment of the major portion of the FIG. 3 embodiment;

DESCRIPTION OF THE PREFERRED EMBODIMENTS

Figure 1:
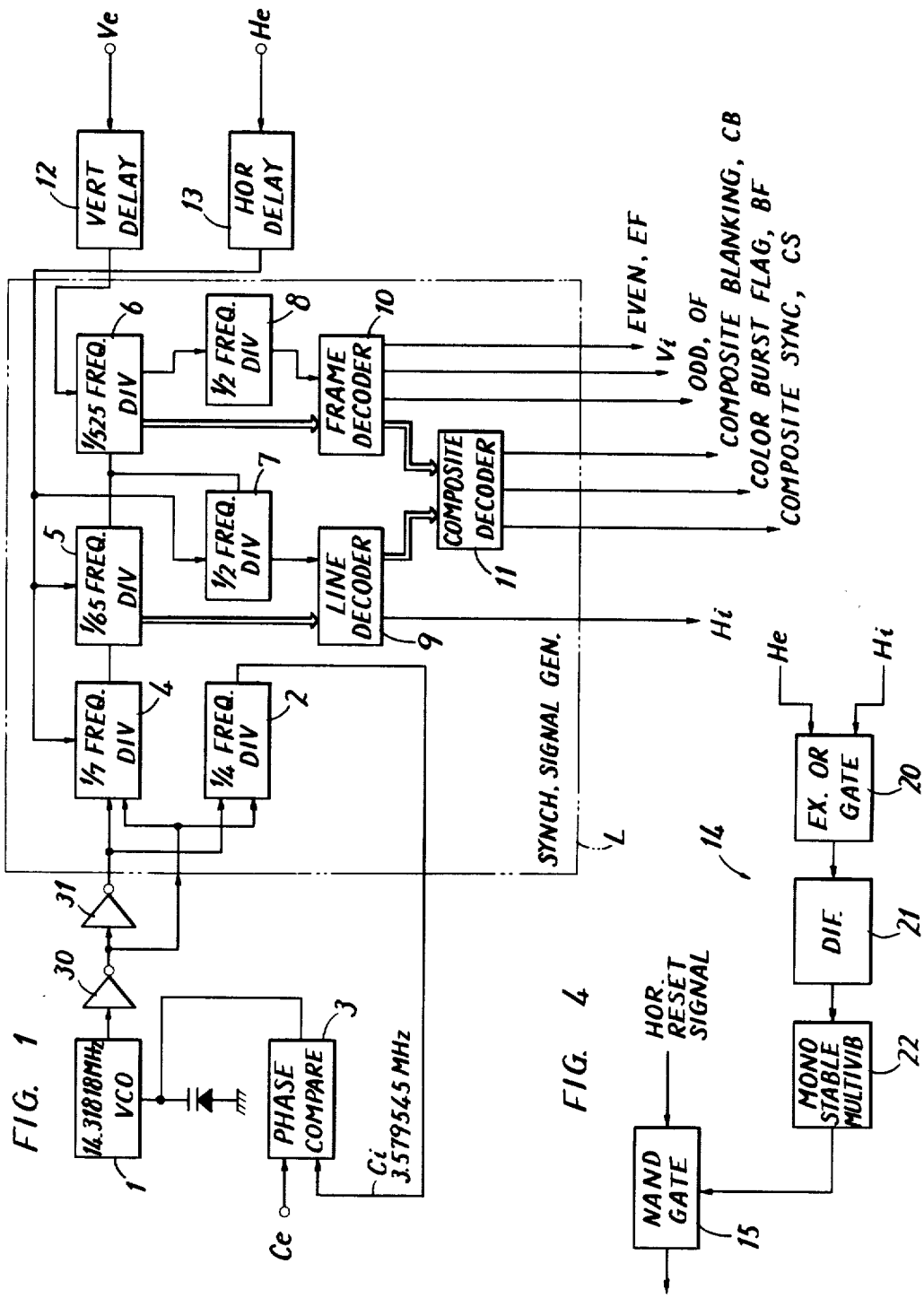
FIG. 1 shows a block diagram of a conventional synchronizing signal generator.
Figure 3:
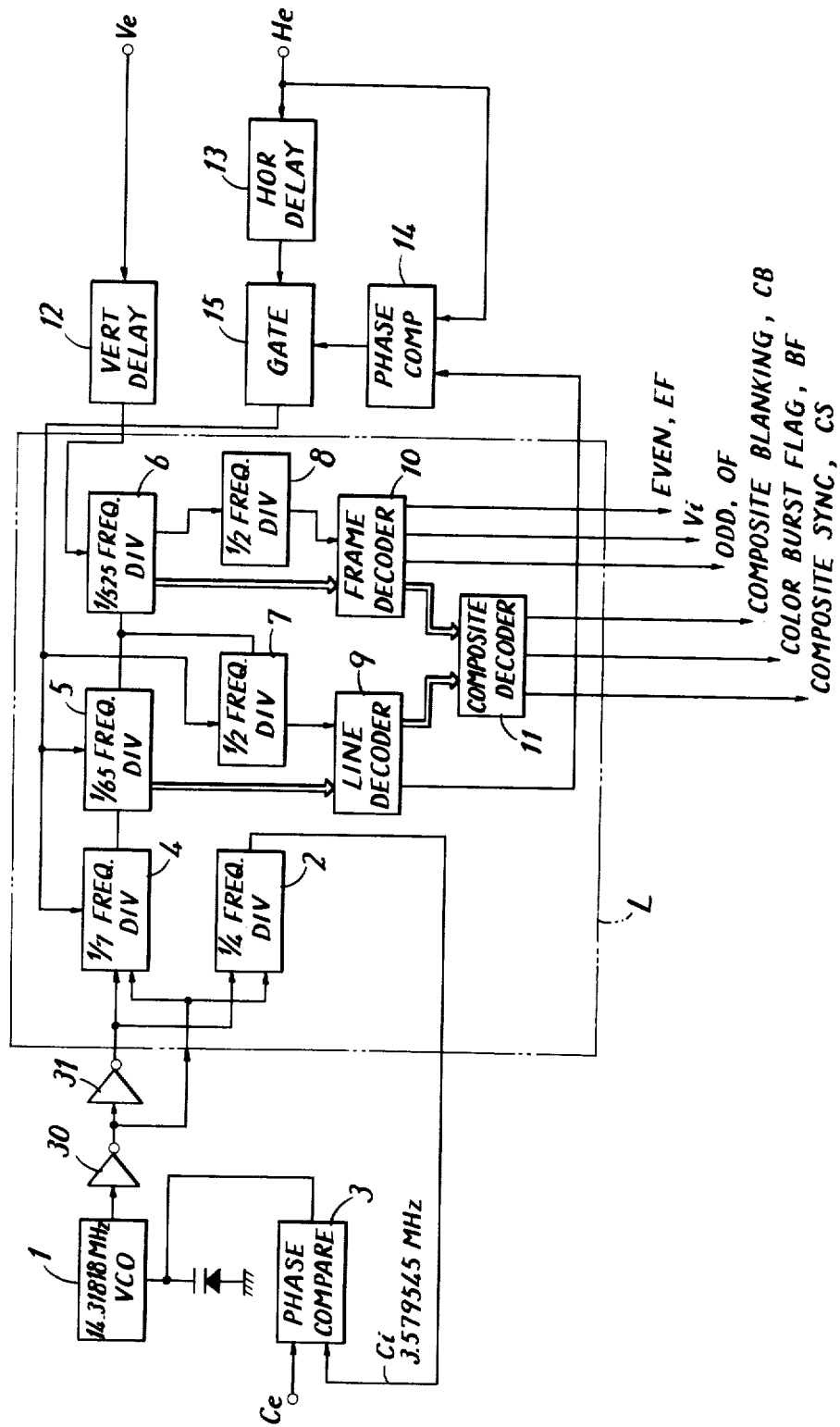
FIG. 3 shows a block diagram of an embodiment of the synchronizing signal generator in accordance with the present invention.

FIG. 3 is similar to FIG. 1 but shows a block diagram of one embodiment of a synchronizing signal generator in accordance with the present invention. Referring to FIG. 3, the internal horizontal synchronizing signal Hi obtained from the line decoder 9 is applied to one input of a phase comparator 14. The external horizontal synchronizing signal He is applied to the other input of the phase comparator 14. The output of the horizontal synchronizing signal delay circuit 13 is applied through a gate circuit 15 to the frequency dividers 4, 5, and 7. The output of the phase comparator 14 is applied to the gate circuit 15 as a gate control signal, so that the output of the delay circuit 13 is prevented from being applied to the frequency dividers 4, 5 and 7 responsive to the output of the phase comparator 14. Since the remaining circuit configuration in the FIG. 3 embodiment is substantially the same as that in the FIG. 1 diagram, it is not believed necessary to describe the same again in more detail.

Now the operation in conjunction with the phase comparator 14 and the gate circuit 15 will be considered. Assuming that the external signals He, Ve, and Ce obtainable from an external synchronizing signal source, not shown, are of a normal phase relation, then the frequency relation between these signals He, Ve, and Ce coincide with the frequency relation of the internal signals Hi, Vi, and Ci. On the other hand, the phase of the external subcarrier signal Ce coincides with the phase of the internal subcarrier signal Ci by means of the phase locked loop, as described with reference to FIG. 1. Therefore, if once the phases of the external and internal horizontal synchronizing signals He and Hi coincide with each other, then a state where the phases of the external and internal horizontal synchronizing signals He and Hi coincide with each other would be maintained, even if a horizontal reset signal in synchronizm with the external horizontal synchronizing signal He by way of the output of the delay circuit 13 is not applied to the frequency divider 4 for each horizontal line period any more. Thus, according to the essential feature of the present invention, the gate circuit 15 is disabled responsive to the output from the phase comparator 14 representative of the coincidence of the phases of the external and internal horizontal synchronizing signals He and Hi, whereby the above described horizontal reset signal is interrupted to eliminate the problem of fluctuation of the internal horizontal synchronizing signal Hi.

Figure 2:
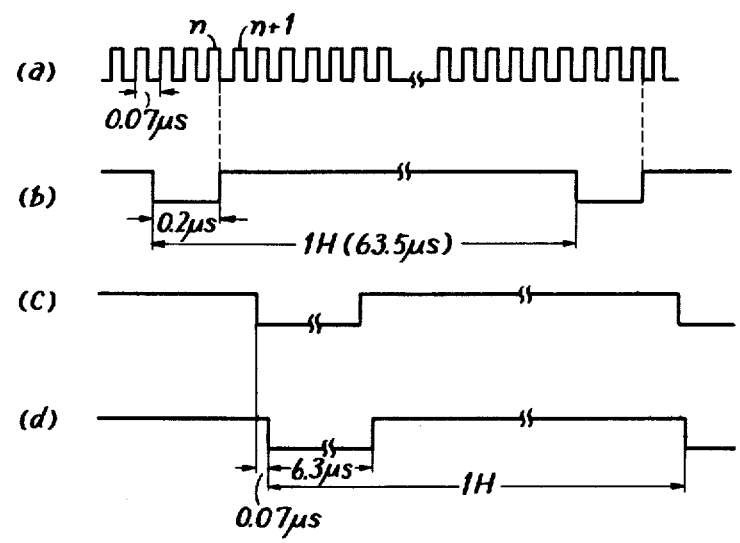
FIG. 2 shows wave forms of various signals for explaining the operation of the FIG. 1 diagram.

Meanwhile, it is necessary to select the sensitivity of coincidence detection by the phase comparator 14 to be a proper value, say 0.2 microsecond larger than 1 cycle period of 0.07 microsecond of the output of the reference oscillator 1 within the synchronization precision range where the phase difference between the external and internal horizontal synchronizing signals He and Hi is allowed. The reason is that the internal horizontal synchronizing signal Hi fluctuates by 0.07 microsecond depending on the horizontal reset timing, as described with reference to FIG. 2 and therefore selection of the sensitivity of coincidence detection to be smaller than the above described cycle period of 0.07 microsecond makes provision of the gate circuit 14 meaningless.

Figure 5:
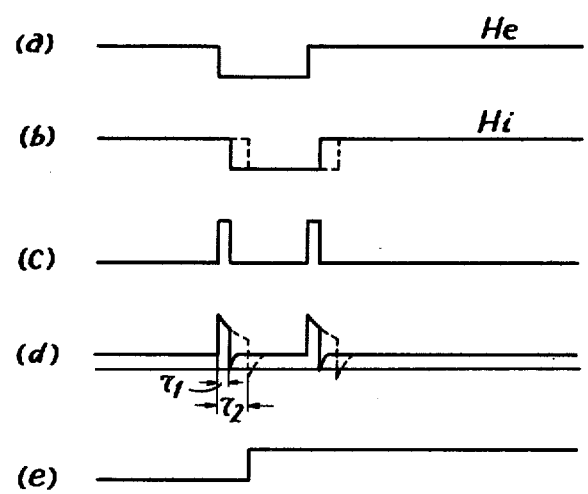
FIG. 5 shows wave forms of the signals at several portions in the FIG. 4 embodiment.

FIG. 4 shows a block diagram of the phase comparator 14 and the gate circuit 15, which is adapted for facilitating the setting of the above described detection sensitivity. The operation of the FIG. 4 embodiment will be better understood with reference to FIG. 5, which shows wave forms of the signals at various portions in the FIG. 4 embodiment. The phase comparator 14 comprises an exclusive OR gate 20 connected to receive the external and internal horizontal synchronizing signals He and Hi, a differentiation circuit 21 for differentiating the output of the exclusive OR gate 20, and a monostable multivibrator 22 which is triggered by the differentiated output from the differentiation circuit 21. The output from the monostable multivibrator 22 is applied as a gate signal to the gate signal 15, which may comprise a NAND gate. The exclusive OR gate 20 receives the external and internal horizontal synchronizing signals He and Hi as shown in the wave forms (a) and (b) in FIG. 5 and provides a pulse as shown in the wave form (c) in FIG. 5 having the pulse width equal to the phase differences of the external and internal horizontal synchronizing signals He and Hi. The pulse signal (c) from the exclusive OR gate 20 is differentiated by the differentiation circuit 21 to be converted into a pulse signal as shown in the wave form (d) in FIG. 5. The monostable multivibrator 22 is triggered with the trailing edge of the pulse signal (d). For the purpose of the present invention, the quasi-stable period of the monostable multivibrator 22 has been selected to be two to three horizontal line periods. If the time constant of the differentiation circuit 21 is selected to be relatively large, then the pulse width of the pulse signal (d) can be selected such that the trigger level of the multivibrator 22 as shown in the dotted line in the curve (d) in FIG. 5 is not exceeded during the time period $\tau 1$ and thereafter the output pulse (e) in FIG. 5 is obtained from the monostable multivibrator 22 during the time period $\tau 2$. Therefore, the time constant of the differentiation circuit 21 may be preferably selected such that the minimum pulse width of the pulse signal (c) exceeding the trigger level of the multivibrator 22 is the above described proper value, say 0.2 microsecond.

Referring to FIG. 3, it is pointed out that it is not necessary to provide any gate circuit with respect to the vertical reset signal obtainable from the delay circuit 12. The reason is that the repetition period of the pulses to the frequency divider 6 is large with respect to the fluctuation of the rise timing of the vertical reset signal and no phenomenon as described with reference to FIG. 2 does not occur in conujunction with the vertical reset signal.

If the synchronizing signal generating circuit L is adapted to be reset with an external composite synchronizing signal, a gate circuit may be operated upon detection of phase coincidence between the external and internal composite synchronizing signals such that the external composite synchronizing signals may be interrupted. It is further pointed out that if the synchronizing signal generating circuit L has been structured such that the horizontal and vertical reset timings are adapted to coincide with the occurence timings of the internal horizontal and vertical synchronizing signals it is not necessary to provide the delay circuits 13 and 12.

Thus, accoridng to the FIG. 3 embodiment, an internal synchronizing signal is generated which is stabilized within the error range of no practical inconvenience, although an internal synchornizing signal in complete synchronism with the external synchronizing signal cannot be obtained. However, in accordance with such embodiment, another problem is encountered in conjunction with a temperature drift. More specifically, the horizontal and vertical delay circuits 13 and 12 each may typically comprise a monostable multivibrator. Such a monostable multivibrator undergoes fluctuation of the quasi-stable period within the range of ± several percents by virtue of a temperature drift. If and when the quasi-stable period of 61.5 microsecond of the horizontal synchronizing signal delay circuit 13 fluctuates by ±0.1 microsecond by virtue of a temperature drift, i.e. the quasi-stable period of the horizontal synchronizing signal delay circuit 13 fluctuates more than ±0.16 percent by virtue of a temperature drift, then the gate circuit 15 is disabled and the phase of the internal horizontal synchornizing signal Hi is brought in disorder, with the result that correction of the phase difference becomes difficult.

In accordance with a preferred embodiment of the present invention, the monostable multivibrator implementing the horizontal synchronizing signal delay circuit 13' is structured such that the quasi-stable period of the monostable multivibrator is gradually changed for each occurence of the external horizontal synchronizing signal He at the interval of the vertical synchronizing signal, whereby a desired delayed output is always obtained in spite of the change of the quasi-stable period of the monostable multivibrator by virtue of a temperature drift, whereby the internal synchronizing signal is caused to coincide with the external synchronizing signal within one field, whereupon the gate circuit is enabled.

Figure 6:
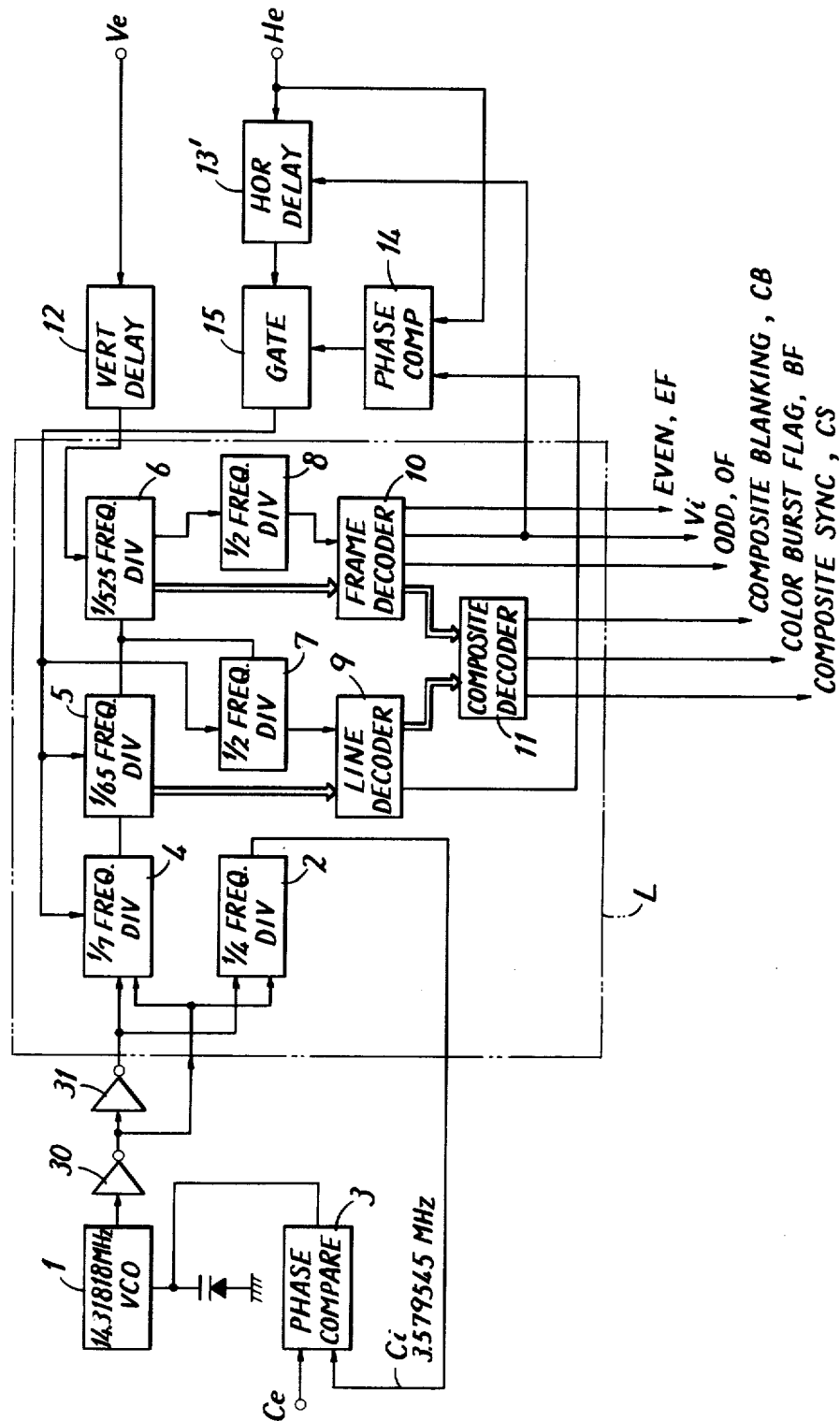
FIG. 6 is similar to FIG. 3 but shows a block diagram of another embodiment of the synchronizing signal generator in accordance with the present invention.

FIG. 6 is similar to FIG. 3 but shows a block diagram of a preferred embodiment of the synchronzining signal generator in accordance with the present invention which employs the above described feature. The essential feature of the FIG. 6 embodiment is that the internal vertical synchronizing signal is applied to the vertical synchronizing signal delay circuit 13' as a control signal, as to be more fully described subsequently. Since the remaining circuit configuration in the FIG. 6 embodiment is substantially the same as that in the FIG. 3 embodiment, it is not believed necessary to describe the remaining portion in more detail.

Figure 7:
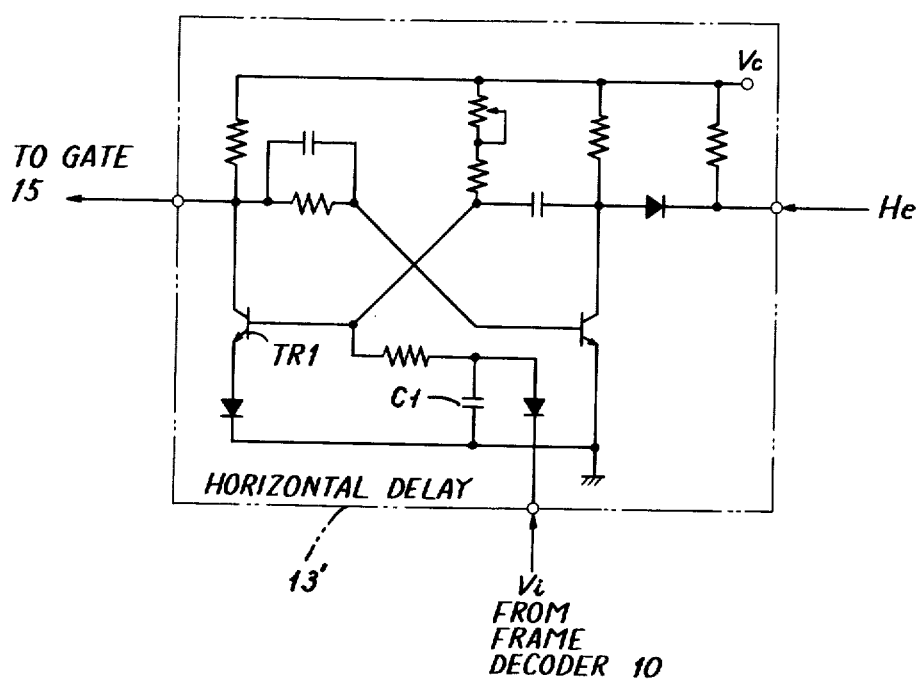
FIG. 7 shows a block diagram of a major portion of the FIG. 6 embodiment.

The horizontal synchronizing signal delay circuit 13' in the FIG. 6 embodiment is structured such that the amount of delay may be varied within the range of about 90 through 110 percent with respect to the prescribed delay amount in the normal temperature. FIG. 7 shows a schematic diagram of such horizontal synchronizing signal delay circuit 13'. Referring to FIG. 7, for the purpose of varying the quasi-stable period of the monostable multivibrator receiving the external horizontal synchronizing signal He as a triggering signal, a charge/discharge circuit for repeatedly charging and discharging at the vertical synchronizing period is connected to the base electrode of a first transistor TR1 which is rendered conductive in the stabilized state. Therefore, a first capacitor C1 for charging/discharging which is rendered in a discharged state responsive to the internal vertical synchronizing signal Vi increases the base potential of the first transistor TR1 as the first capacitor C1 is gradually charged, whereby each time the triggering signal is applied the quasi-state period is gradually changed to 110 to 90 percent of the prescribed quasi-stable period. Accordingly, even if the quasi-stable period of the monostable multivibrator is changed within the range of ± several percents by virture of a temperature drift, the desired quasi-stable period is always within the variable range of the quasi-stable period by means of the first capacitor C1, with the result that the monostable multivibrator can always provides the output of the desired quasi-stable period.

As described above, the delayed output as obtained from the horizontal synchronizing signal delay circuit 13' is changed of the delayed amount, so that when the same is applied to the synchronizing signal generator L the external horizontal synchronizing singal He and the internal horizontal synchronizing signal Hi are normally out of phase by more than 0.2 microsecond and the gate control circuit 14 disables the gate circuit 15. Therefore, although the synchronizing signal genrator L is reset each time the delayed output is obtained, when the above described horizontal synchronizing signal delay circuit 13' provides a prescribed delayed amount, the phase difference between the external horizontal synchronizing signal He and the internal horizontal synchronizing signal Hi becomes less than 0.2 microsecond and the gate circuit 15 is enabled at least within 1/60 second after the gate circuit 15 is disabled, whereby a stabilized synchronizing signal can be obtained from the synchronizing signal generator L even in any temperature situation.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A synchronizing signal generator responsive to an external synchronizing signal including an external subcarrier signal, an external horizontal synchronizing signal and an external vertical synchronizing signal for a television signal, comprising:

reference oscillator means phase controlled in response to said external subcarrier signal for generating an internal reference signal, first frequency dividing means for frequency dividing said internal reference signal said first frequency dividing means being reset in response to said external horizontal synchronizing signal at each horizontal period, line decoder means coupled to said first frequency dividing means for decoding the frequency divided output of said first frequency dividing means for providing an internal horizontal synchronizing signal, second frequency dividing means for frequency dividing said reference signal said second frequency dividing means being reset in response to said external vertical synchronizing signal at each vertical period, frame decoder means coupled to said second frequency dividing means for decoding the frequency divided output of said second frequency dividing means for providing an internal vertical synchronizing signal, phase comparator means for comparing the phases of said external and internal horizontal synchronizing signals, gate means coupled to said first frequency dividing means for controlling the application, of said external horizontal synchronizing signal therethrough to said first frequency dividing means and for preventing the application of said external horizontal synchronizing signal in response to the output of said phase comparing means, whereby said external horizontal synchronizing signal is prevented from being applied to said first frequency dividing means when the phases of said external and internal horizontal synchronizing signals coincide with each other, and variable delay means coupled to said gate means and to said frame decoder means, said variable delay means controlling the delay of the application of external horizontal synchronizing signal to said gate means in response to the internal vertical synchronizing signal output of said frame decoder means.

2. A synchronizing signal generator as set forth in claim 1 wherein said reference oscillator means comprises a phase locked loop having a voltage controlled oscillator, a frequency divider coupled to the output of said voltage controlled oscillator, and a phase comparator coupled to said frequency divider, said phase comparator comparing to the output of said frequency divider with the phase of an external subcarrier, the output of said phase comparator being applied to said voltage controlled oscillator.

3. A synchronizing signal generator as set forth in claim 1 wherein said variable delay means delays the external horizontal synchronizing signal in a linear, periodic manner responsive to the internal vertical synchronizing signal.

4. A synchronizing signal generator as set forth in claim 1 wherein said phase comparator means comprises:
   (a) an OR gate, the external, vertical and horizontal synchronizing signals being applied to the inputs thereof;
   (b) differentiator means coupled to the output of said OR gate; and
   (c) monostable multivibrator means coupled to the output of said differentiator means.

5. A synchronizing signal generator as set forth in claim 1 wherein said variable delay means comprises a monostable multivibrator means having a variable quasi-stable period.

6. A synchronizing signal generator as set forth in claim 1 wherein said variable delay means comprises a saw-tooth wave generator means, said generator means being responsive to the internal vertical synchronizing signal.

7. A synchronizing signal generator as set forth in claim 1 wherein the delay of said variable delay means is varied to provide compensation for temperature drift in the variable delay means.

* * * * *